Figure 1:
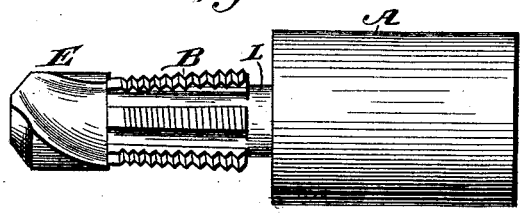

(No Model.)   2 Sheets—Sheet 1.

J. W. DOUGLAS.
COMBINED DRILL OR REAMER, TAP, AND SOCKET.

No. 279,360.   Patented June 12, 1883.

Witnesses.
Robert Everett
J. A. Rutherford

Inventor
Joseph W. Douglas.
By James L. Norris.
Atty.

(No Model.) 2 Sheets—Sheet 2.
J. W. DOUGLAS.
COMBINED DRILL OR REAMER, TAP, AND SOCKET.
No. 279,360. Patented June 12, 1883.
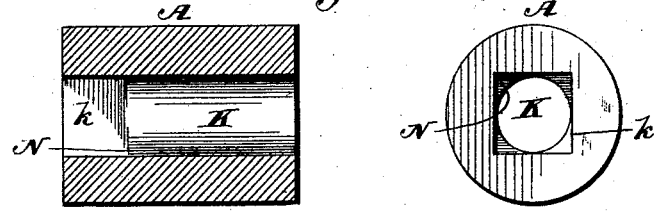
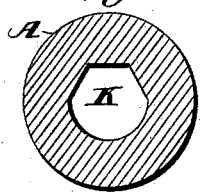 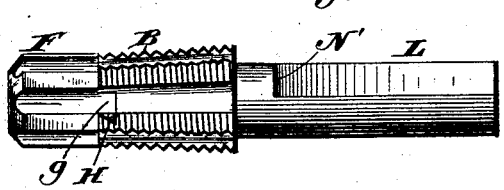 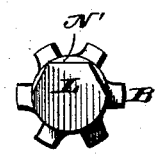
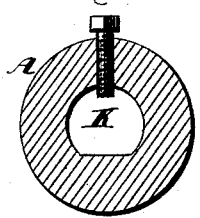 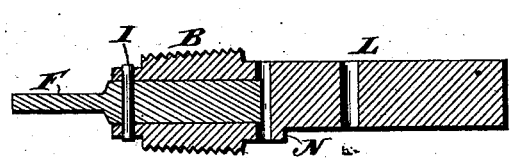
Witnesses.
Robert Everett
J. A. Rutherford
Inventor
Joseph W. Douglas.
By James L. Norris.
Atty.

UNITED STATES PATENT OFFICE.

JOSEPH W. DOUGLAS, OF MIDDLETOWN, CONNECTICUT.

COMBINED DRILL OR REAMER, TAP, AND SOCKET.

SPECIFICATION forming part of Letters Patent No. 279,360, dated June 12, 1883.

Application filed December 4, 1882. (No model.)

*To all whom it may concern:*

Be it known that I, JOSEPH W. DOUGLAS, a citizen of the United States, residing at Middletown, Middlesex county, Connecticut, have invented new and useful Improvements in a Combined Drill or Reamer, Tap, and Socket, of which the following is a specification.

The object of this invention is to provide a simple, efficient, and conveniently-manipulated combined drill, tap, and socket for tapping steam, gas, and water pipes, and for machinists' use in general where a drill or reamer and a tap are required, said device being so constructed that, after the pipe or other article has been drilled and tapped, the combined drill or reamer and tap will be readily freed from the socket, whereby the drill or reamer and the tap can be again placed in the socket in order to drill or ream and screw-tap a new opening in the pipe or other article.

To such end my invention consists in the combination, with a tap provided at one end with a detachable drill or reamer and at its opposite end formed with a shank, of a socket-piece adapted to receive said shank and hold the same in a lathe, said shank being removably fitted in the socket, and prevented from turning independently of the socket-piece; also in the tap provided with a shank which is removably fitted in a socket so as to be held from turning independently of the socket, said tap being further provided with a socket for receiving either a drill or a reamer; also in the particular construction of parts, all as hereinafter described, and illustrated in the drawings, in which—

Figure 2:
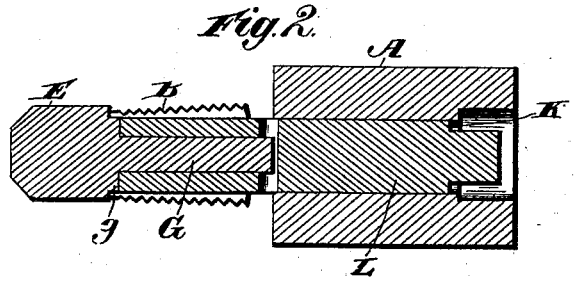
Figure 3:
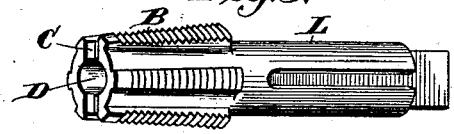
Figure 4:
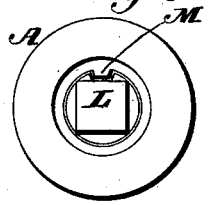
Figure 5:
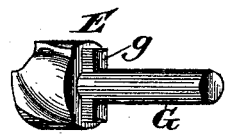

Figure 1 represents a side view of my improved combined drill, tap, and socket; Fig. 2, a longitudinal section through the same. Fig. 3 represents the tap; Fig. 4, an end view of the tap and socket; Fig. 5, the drill, and Fig. 6 the reamer. Fig. 7 is a longitudinal section through the socket-piece, and including an end view of the same. Fig. 8 is a side view of the tap adapted to be held in said socket-piece. Fig. 9 is a transverse section through a socket-piece having another form of socket; and Fig. 10 represents a side and end view of a tap adapted to fit in said socket, the tap in this instance having a reamer held in its end in a slightly different manner from that shown in Figs. 1 and 2. Fig. 11 is a transverse section through a socket-piece having another form of socket. Fig. 12 shows a longitudinal section through a tap adapted to fit in said socket, and provided with a drill or a reamer secured in a slightly different way from those illustrated in the preceding figures.

In the several figures of the drawings, A indicates the socket-piece, which is designed to be applied to a lathe in any convenient way.

B indicates the tap, which is screw-threaded at one end, and provided with a series of longitudinal grooves, which are formed in the said screw-threaded portion of the tap. The tap in all of the figures except Fig. 12 is provided at one end with a transverse mortise, C, and a central longitudinal bore or socket, D, so as to be capable of holding either the drill or the reamer, each of which is adapted to fit in said transverse mortise and longitudinal central socket. It will be seen that the drill E and reamer F are each provided with a shank or spindle, G, and a flat body portion, *g*, the said shank being capable of fitting in the central longitudinal socket in the tap, and the flat body portion of the drill or reamer being adapted to fit in the mortise formed transversely through the tap. By such means the strain is taken from the shank or spindle of the drill or reamer, and at the same time these two tools are made readily interchangeable.

Figure 6:
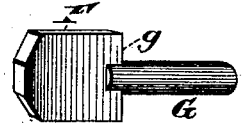

In Fig. 6 the reamer is made flat and provided with a spindle, while in Fig. 10 the reamer consists of a longitudinally fluted or corrugated cylindrical body having a flat portion which is received in the transverse mortise in the tap; also, in said Fig. 10 the mortise has its wall or walls inclined on one side, and a wedge or key, H, inserted between the flat body portion *g* and the said inclined wall of the mortise.

In Fig. 12 the reamer has a flat body and a shank, which is made rectangular in cross-section and fitted in a corresponding recess formed in the tap, in which case a pin, I, is inserted in an opening formed transversely through the tap and the reamer-shank.

The several ways in which I form the shank of the drill or reamer and the socket in the socket-piece are as follows: In Figs. 2 and 4 the socket-piece is formed with a longitudinal bore, which constitutes the socket K. The shank L of the drill or reamer is made cylindrical, so as to fit in said socket, and is prevented from turning independently of the socket-piece by means of a spline, M, in the socket, which is received in a groove formed longitudinally in the shank; or the groove can be formed in the socket-piece and the shank provided with a feather or spline.

In Fig. 7 the socket is made cylindrical for the greater part of its length, the remaining portion thereof being rectangular in cross-section, as indicated at $k$, and the shank of the drill or reamer is made cylindrical at one end and rectangular at the other, so as to fit in the said socket, as shown in Fig. 8.

In Fig. 9 the socket is made of a polygonal shape, one half being made semi-cylindrical and the other of angular sides. The shank of the drill or reamer, Fig 10, is made to correspond with the said socket, and hence when fitted therein is prevented from turning independently from the socket-piece. The socket may be formed with a partly-cylindrical bore, as shown in Fig. 11, and the shank of the drill or reamer made partly cylindrical, with one flat side, as in Fig. 12.

It will be observed in each of the illustrations which I have described that a shoulder, N, is formed in the socket, near one end thereof, and a like shoulder, N', formed on the shank of the drill or reamer, whereby said shoulders will abut against each other when the shank is fitted in the socket; also, in any or all of the forms herein shown, a hole is formed through the shank of the tap, wherein a pin or screw can be inserted and forced against or brought into engagement with the spindle of the drill or reamer. After the hole has been drilled, reamed, and screw-tapped, the tap will be loosened and can be readily removed from the socket, so that the tap can be again placed in the socket when it is desired to bore or screw-tap another opening.

Having thus described my invention, what I claim is—

1. The combination, with a tap provided at one end with a detachable drill or reamer, and its opposite end with a shank, of a socket-piece adapted to receive said shank and hold the same on a lathe, said shank being removably fitted in the socket and prevented from turning independently of the socket-piece, substantially as described.

2. The tap provided with a shank at one end, which is removably fitted in a socket-piece, so as to be capable of sliding freely out of the same, and prevented from turning independently of the socket-piece, said tap being also provided with a transverse mortise, and with a central longitudinal socket for receiving the drill or reamer, substantially as described.

3. The combination of the socket-piece with the tap having a shank which is fitted to slide in said socket, and prevented from turning independently of the socket-piece by means of a spline and groove, said tap being further provided with a detachable drill or reamer, substantially as described.

4. The combination, with the socket-piece, of a tap having a shank portion fitted thereon, and provided with a detachable drill or reamer having a flat body portion, $g$, and a round spindle, respectively received in a transverse mortise and a central longitudinal socket in the tap, substantially as described.

In testimony whereof I have hereunto set my hand in the presence of two subscribing witnesses.

JOSEPH W. DOUGLAS.

Witnesses:
JOHN N. CAMP,
G. A. CRAIG.